Feb. 12, 1957 R. S. BINFORD ET AL 2,781,049
LIQUID FLOW CONTROL VALVE SYSTEM
Filed Dec. 29, 1951
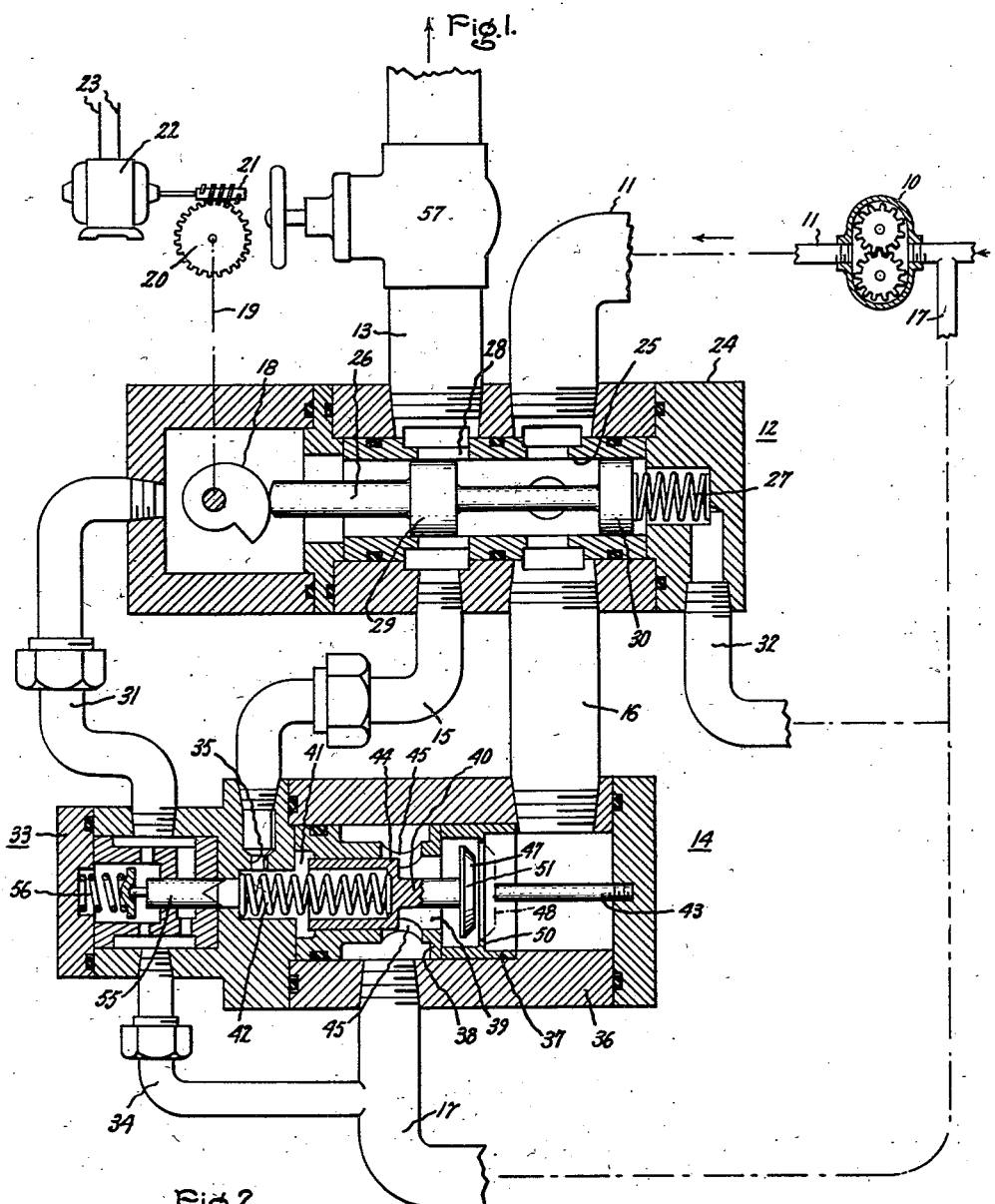
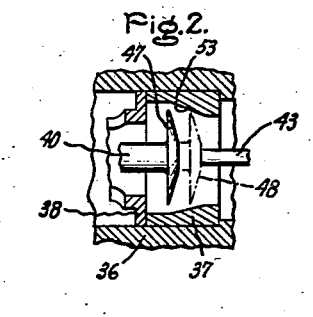
Inventors:
Robert S. Binford
John W. Jacobson
by Richard E. Hosley
Their Attorney.

United States Patent Office 2,781,049
Patented Feb. 12, 1957

2,781,049

LIQUID FLOW CONTROL VALVE SYSTEM

Robert S. Binford and John W. Jacobson, Schenectady, N. Y., assignors to General Electric Company, a corporation of New York Application December 29, 1951, Serial No. 264,174

11 Claims. (Cl. 137—108)

This invention relates to an improved valve system for precise control of the flow of a liquid such as water or liquid fuel, in accordance with a predetermined function which may be represented, for instance, by a mechanical or electrical input signal.

In certain physical applications, it is often desirable to obtain a volume rate of liquid flow which may be set at a predetermined quantity independent of the back pressure of the apparatus to which liquid is being supplied and independent of variations in pressure of the liquid supply. In order to solve this problem, the combination of a throttle valve which may be set at a predetermined flow orifice and a constant pressure regulating bypass valve has been employed. The constant pressure regulating valve by-passes an amount of liquid necessary to maintain, across the throttle valve orifice, a constant pressure which is substantially independent of system input and output pressures over fairly wide pressure ranges. Ideally, this arrangement provides a predictable rate of liquid flow proportional to the throttle valve orifice opening. This is true since a constant pressure across an orifice will produce a liquid flow substantially independent of pressure level and substantially entirely dependent upon the area of the orifice.

Where such a system is to be used over wide ranges of pressure and flow delivery, substantial variations in the flow of liquid through the bypass valve portion of the system are required in order to maintain the constant throttle valve pressure. Upon the occurrence of any flow through the bypass valve, a valve reaction force arises tending to assist the valve closing forces, and this reaction effect and the resulting force vary as the liquid flow through the bypass valve varies. These varying reaction forces alter the operation of the bypass valve so that a constant pressure drop is no longer maintained.

Accordingly, it is one object of this invention to provide an improved liquid flow control system having a predictable flow rate corresponding more precisely to an input signal by more accurate regulation of pressure across a throttle valve under conditions of varying liquid flow by the provision of means for compensation of flow reaction in a pressure regulating valve.

Ordinarily, the liquid flow control apparatus of this invention is called upon only to maintain a constant pressure and a predetermined volume of flow which may be precisely set. However, in certain applications of such a system, a separate shut-off valve or other means of obstructing the flow from the liquid flow control apparatus may be provided, which would independently limit the rate of flow. Under these circumstances, the outlet pressure of the system of this invention would increase upon closure of the shut-off valve, and the inlet pressure supplied from the pump would likewise increase rapidly to dangerous levels since the inlet pressure is constantly held at a pressure higher than the outlet pressure. Such over-pressure conditions may cause destruction of the pump or of other components of the system.

Accordingly, it is a further object of this invention to provide an improved liquid flow control apparatus of the constant pressure type, including means for relief of over-pressure conditions due to an excessive system back pressure.

Another condition which may be troublesome in liquid flow control valve systems as described, is that a separate shut-off valve in the outlet conduit may cause unwanted over-pressure conditions even when the throttle valve component is in the closed position, due to leakage of high pressure fluid around the throttle valve.

Accordingly, a further object of the present invention is to provide an improved fluid flow control valve system in which unwanted and dangerous over-pressure conditions are avoided under shut-off or standby conditions.

In carrying out the objects of this invention, an improved liquid flow control valve system may be employed in which compensation for flow reaction in a bypass valve element is obtained by means of an additional orifice through which the bypass liquid must travel. This orifice is provided around an enlarged valve piston tip having a greater diameter than the valve land, in which the pressure drop across the orifice is effective on the tip to provide a compensating force on the bypass valve piston. An over-pressure relief pilot valve responsive to the outlet pressure of the system may be provided which, when opened, reduces the normal closing pressure of the bypass valve so as to cause the bypass valve to open, the over-pressure pilot valve and the bypass valve elements thereby comprising a two-stage over-pressure relief system. The liquid flow controlling land of the throttle valve may be so proportioned that when the throttle valve is in the closed position so as not to permit passage of liquid therethrough in the normal manner, an auxiliary opening is provided, at this throttle valve land, from the outlet conduit to a low pressure exhaust line so as to relieve any pressure build-up which might occur through leakage around the throttle valve to the outlet conduit.

For a better understanding of this invention, reference should be made to the following specification and the accompanying drawing in which Fig. 1 is a schematic diagram of a preferred embodiment of the improved liquid flow control valve system of this invention; and Fig. 2 is a partial view of an alternative embodiment of the fluid flow reaction compensating tip for the bypass valve element.

Referring more particularly to Fig. 1, there is shown a pump 10 connected through a conduit 11 to deliver liquid under pressure to a throttle valve 12, through which liquid is passed to an outlet or discharge or delivery conduit 13. Although pump 10 is shown as a fixed displacement gear pump device, it is anticipated that volume of pump delivery to the flow control valve system may vary, by reason of variations in the speed of the pump which are independent of the present system, or because of employment of other types of pumps in which delivery rate may vary. A bypass valve 14 is connected across the throttle valve 12 by means of conduits 15 and 16. The valve 14 bypasses a certain amount of the liquid supplied from pump 10 back to the pump inlet by means of an exhaust or return conduit 17, to maintain the pressure across throttle valve 12 at a predetermined constant value.

The throttle valve 12 may be set for a predetermined desired liquid flow rate by means of a throttle valve positioning cam 18, which may be rotated by a shaft schematically shown at 19, operated by a pinion 20, a worm 21, and an electrical positioning motor 22. Positioning motor 22 may be energized through electrical connections 23 from an automatic electrical regulating system, or as the terminus of an electrical remote positioning system for electrical follow-up control of a manual positioning lever, in order to determine the magnitude of liquid flow.

The throttle valve 12 includes a casing 24 having an inner cylindrical bore 25 in which a valve piston 26 is mounted for reciprocal movement. The left end of the piston 26 serves as a follower for cam 18, and a compression spring 27 is provided at the right end of piston 26 for bias against cam 18. The area of the throttle valve opening at the outlet port 28 is therefore determined by the position of land 29 of the piston 26, in accordance with the position of the cam 18. Land 30 is provided at the right end of throttle valve piston 26 as a guiding and supporting member, and for retention of liquid under pressure in the central portion of the valve bore. Leakage of the fluid under pressure past the valve lands 29 and 30 is respectively provided for by conduits 31 and 32, which convey the excess liquid back to the low pressure line 17 to the inlet of pump 10. The path for this leakage from conduit 31 is through the housing of an over-pressure relief valve 33, which is shown as built into the left-end of the housing of the bypass valve 14, to be described more fully below, and an additional conduit 34.

As was stated above, the bypass valve 14 is connected across the throttle valve 12 by means of liquid conduits 15 and 16. The conduit 15 connects the bypass valve 14 to the outlet or discharge conduit 13, and consequently to outlet liquid pressure, and the conduit 16 connects bypass valve 14 to inlet conduit 11 and inlet liquid pressure. The rate of liquid flow through conduit 15 is preferably limited by an orifice, either in the conduit itself, or as the orifice 35 shown within valve 14. Bypass valve 14 may include a valve casing 36 which may have inner sleeve members 37 and 38 respectively defining special liquid passages and a cylindrical valve bore 39 in which a piston 40 is reciprocally mounted. The portion of the valve interior to the left of piston 40 defines a chamber 41 communicating with conduit 15 through orifice 35. A compression spring 42 biases piston 40 to the right in the drawing against an adjustable stop member 43, so that a valve land 44 closes valve discharge ports 45. A special tip 47 is provided at the right end of bypass valve piston 40, and the purpose and operation of this tip will be described more fully below. The bypass valve is shown in a partially opened position in the drawing, but the closed position of the valve is indicated by a dotted outline of valve tip 47, shown at 48.

It will be seen that bypass valve 14 is operated by a balance of the discharge fluid pressure from conduit 15 within chamber 41 together with the pressure of compression spring 42 operating from left to right on piston 40 against the inlet pressure from conduit 16 acting to the left on piston 40. It will be seen then that if the inlet pressure from conduit 16 becomes excessive, a movement of bypass valve piston 40 to the left, opening the valve ports 45 to discharge liquid from the inlet conduit system into the low pressure exhaust system of conduit 17 will permit a decrease in this pressure, and an equilibrium position of the bypass valve piston may be required in which a certain amount of liquid is constantly bypassed from conduit 16 into low pressure conduit 17. Since the areas of the bypass valve piston 40 operated upon by the outlet and inlet pressures from conduits 15 and 16 are substantially equal, as represented by the cross-sectional area of valve land 44, the difference in pressure which is held between the inlet and discharge conduits is determined primarily by the force of compression spring 42. (This pressure will be seen to equal the spring force divided by the piston area.) It will be seen, therefore, that the bypass valve 14 automatically bypasses an amount of liquid sufficient to provide a constant pressure drop across throttle valve 12, regardless of the magnitude of the back pressure in discharge conduit 13 or the inlet pressure from pump 10.

However, it has been found that upon the occurrence of any flow through the ports 45 of bypass valve 14, a dynamic valve reaction force is set up which tends to assist the force of spring 42 and the discharge pressure within chamber 41, thereby altering the "constant pressure" calibration of the bypass valve. This force is troublesome because it varies for different rates of bypass flow and it ceases to exist altogether upon closure of the bypass valve. However, the addition of the special valve tip 47 overcomes the difficulties presented by these valve reaction forces. It will be seen that the tip 47 is of a larger diameter and therefore has a larger area than the valve land 44. It has been found in one practical embodiment that an area for tip 47 approximately double that for land 44 provides the desirable characteristics to be described. An annular rib 50 is provided on the inner surface of sleeve member 37 to provide a reduced spacing or orifice around the outer periphery of tip 47 when bypass valve piston 40 is in the fully closed position. A workable cross-sectional area for this minimum orifice around the outer periphery of tip 47 has been found to be approximately one-half the cross-sectional area of valve land 44. It will be seen from the drawing that the tip 47 includes a surface 51 which is inclined at an angle of approximately 45 degrees in the shape of a frustrum of a cone, so as to provide a gradual opening of the orifice around the periphery of land 47 as bypass valve piston 40 moves to the left in the opening direction.

Upon such movement of the bypass valve piston 40, opening discharge ports 45 to initiate bypass fluid flow, a pressure drop occurs across the tip 47 by reason of the orifice around the tip periphery. Tip 47 is therefore subjected to full inlet pressure at its right side, but only to a pressure reduced by the drop through the orifice on its left side, so that there is a resultant force on the valve piston 40 from tip 47 in the valve opening direction. This force is in a direction opposite to the valve reaction force described above and provides for compensation for this valve reaction force. Proper design and proportioning of the special valve reaction compensating tip 47 is required in order to accomplish this result. The relative proportional dimensions which were described above have been found to be suitable for this purpose in a practical embodiment of this invention.

As stated above, these workable proportions were found to be: a cross-sectional area for tip 47 of approximately twice the cross-sectional area of land 44, and a cross-sectional area for the orifice around the periphery of tip 47 of approximately one-half the cross-sectional area of land 44. These proportions were found to be workable in a valve system in which the pressure was to be maintained at approximately 35 lbs. between the inlet and discharge conduits, and in which the drop across the compensating tip was to be limited to approximately half this total pressure drop under maximum bypass valve flow conditions. It will be appreciated by those skilled in the art that an appreciable portion of the total pressure drop across the bypass valve must always occur across the port which is closed by valve land 44. This condition is desired in order that adequate control of the bypass valve may be maintained by the pressure between the inlet and outlet conduits. It will be obvious then that the design of the compensating tip 47 and the annular orifice surrounding it would be subject to the following considerations:

An annular orifice area should be chosen which is as small as possible without having substantially all of the pressure drop of the bypass valve occur across the compensating tip, i. e., leaving an appreciable portion of the pressure drop to occur across the port 45 at the main valve land 44. An area for the compensating tip 47 is then chosen which, with the pressure drop across this tip which is provided by the orifice previously chosen, will provide the magnitude of flow reaction compensation force required. By choosing a compensating orifice as small as possible, within the limitations stated, maximum compensation forces are available for a given size of compensating tip, in order to permit attainment of the desired compensation with a compensating tip of minimum size, thus keeping the size of the entire apparatus to a minimum and saving space and weight. In the design of pressure regulating bypass valves for operation at pressure differentials other than that stated, different compensating tip and orifice areas and configurations might be required in order to achieve the desired flow reaction compensation effects. Likewise, the design value of maximum flow rate may also determine the design of compensating tip and orifice areas and configurations.

It will be appreciated that the flow reaction compensating tip 47 must have a larger cross-sectional area than the valve land 44, in order to provide any compensating force. This is true because the right end of land 44, statically subjected to full inlet pressure, in the presence of bypass valve flow is subjected only to the inlet pressure decreased by the pressure drop across tip 47. The resulting decreased valve opening force on land 44 therefore effectively cancels the compensating effect of an area of the tip 47 equal to the area of land 44. It will be seen, therefore, that it is only the excess of the area of tip 47 over the area of land 44 which provides the compensating force.

It has been found in practical use that the range of operating movement of bypass valve piston 40 is quite small, being generally limited to the minimum opening range. As the bypass valve opens, and the bypass flow rate increases, the pressure drop required across compensating tip 47 may be maintained with a larger orifice. Accordingly, the conically tapered surface 51 provides for gradual increase in the orifice at the periphery of tip 47 as the valve opens.

As illustrated in Fig. 2, it will also be understood that the bore of sleeve 37 may be tapered as shown at 53 in order to provide a progressively increasing aperture around the periphery of tip 47 upon opening movement of valve piston 40. This is understood to be but one alternative embodiment which would provide the desired characteristics. It will be seen that in such an embodiment as this, the compensating tip 47 may be provided with a sharp outer edge so that the shape of this tip is not as effective in changing the orifice as is the tapered bore 53.

Since the valve reaction forces may be found to vary in other than a linear manner as the valve opens, it will be understood that the valve surface 51, as shown in the embodiment of Fig. 1, or the bore surface 53 shown in Fig. 2, may be modified in both shape and in angle in order to provide precise compensation over a wide range of bypass valve movement.

As mentioned above, an over-pressure relief pilot valve 33 is built into the housing 36 of bypass valve 14. This pilot valve includes a valve piston 55 in communication with chamber 41, and the discharge conduit pressure therein, and is biased to the right into a closed position by a compression spring 56. Upon the occurrence of an obstruction in outlet conduit 13, such as by closure of a separate shut-off valve 57 which may be provided, causing a diminution in liquid flow through the throttle valve 12, a dangerous buildup of pressure, high enough to damage the pump 10 or the conduit system may occur. Just before such a danger point is reached, the pressure in the outlet conduit 13 and chamber 41 of the bypass valve achieves a value which forces over-pressure relief pilot valve 55 into the open position. Such opening causes discharge of liquid from the chamber 41, into the low-pressure conduit system including conduits 34 and 17, returning to the inlet of pump 10, thus decreasing the pressure within chamber 41. This decrease of pressure in the discharge pressure side of the bypass valve 14 causes movement of the bypass valve piston 40 to the left, in the opening direction, so as to bypass a large volume of liquid to the low-pressure conduit 17, thus reducing the back-pressure on pump 10, reducing the pressure level of the system, and avoiding over-pressure damage.

It will be seen that the over-pressure relief pilot valve 33 and the bypass valve operate together in what may be called a two-stage over-pressure relief system, in which the pilot valve detects the over-pressure condition and controls the operation of the bypass valve piston in order to relieve a large volume of liquid and thereby reduce and maintain a predetermined maximum fluid pressure. This action of the bypass valve element is entirely separate from the usual function of maintaining a constant pressure across the throttle valve 12. It will be understood that since the bypass valve maintains a constant pressure between the inlet and discharge conduits of the system, and since the over-pressure relief pilot valve is connected for operation in response to the pressure difference between the system discharge conduit 13 and the exhaust conduit 17 which returns to the fluid pump, the over-pressure relief pilot valve may be said to be operable in response to an over-pressure condition of the pump 10. The actual calibration of the over-pressure relief pilot valve 55 is therefore preferably less than the maximum permissible pressure on the pump 10 by the amount of the constant pressure to be held across the throttle valve by the bypass valve.

A common condition which may occur is that the system may be substantially shut down, i. e., the cam 18 sets the throttle valve piston 26 in a closed position, closing throttle valve port 28, and the discharge conduit shut-off valve 57 is also in the closed position. This shut down condition may exist during a stand-by situation while pump 10 is in operation. Under such conditions, the output of pump 10 must be discharged to the low pressure line by opening of bypass valve 14. The bypass valve 14 will attempt to serve its usual function of maintaining a constant pressure drop between the inlet conduit 11 and discharge conduit 13. Therefore, if discharge conduit 13 is at a very low pressure, a low pressure level will be maintained in the system. Similarly, if a high pressure exists in discharge conduit 13, a high pressure level is maintained in the entire system. It is obvious that, no matter how closely the valve land 29 fits within throttle valve bore 25, if the valve is free enough for movement, there will be a certain amount of leakage around valve land 29 from the high pressure side of throttle valve 12 to the low pressure side. This will be true as long as a pressure differential between inlet conduit 11 and discharge conduit 13 exists, even though throttle valve 12 is in the completely closed position. It will be obvious that if the shut-off valve 57 is also closed, the pressure will gradually build up in discharge conduit 13, due to this leakage, until a dangerous over-pressure condition exists. The over-pressure relief system, including over-pressure relief pilot valve 33, must therefore operate in order to avoid over-pressure damage to the system. This means that under normal throttle valve shut-off conditions in which the separate shut-off valve 57 is also closed, the entire system is operated at an unnecessarily high emergency pressure at which the emergency over-pressure relief system becomes effective, and this condition imposes an unnecessarily high load on pump 10, causing excessive pump wear and requiring unnecessary amounts of pump input energy. Also, this places exclusive reliance, in a commonly recurring situation, on the emergency over-pressure relief system.

In order to avoid this undesirable result, the valve land 29 is made to have an axial length which is less than the axial dimension of throttling port 28, so that when the cam 18 sets the throttling valve 26 to the position where valve land 29 cuts off all normal flow from inlet conduit 11 to discharge conduit 13 through port 28, the left end of valve land 29 uncovers a portion of port 28 to vent the discharge conduit 13 into the left end of throttle valve housing 24 and through conduits 31 and 34 to low pressure return line 17, to thereby maintain the discharge conduit 13 at substantially the low pressure return line pressure. As pointed out above, maintaining the discharge conduit at a low pressure under shut-off conditions achieves the desirable result of maintaining the entire system at a minimum pressure during standby conditions in which both the throttle valve and the shut-off valve may be closed. Thus, the undesirable and unnecessary energy input to the pump, and pump wear, and the maintenance of the system at continuously high pressure are avoided.

It will be seen from the above description that this invention provides a greatly improved fluid flow control valve system which achieves all of the objectives previously set forth. While certain specific embodiments have been shown and described, it will be understood that various modifications may be made without departing from the invention. The appended claims are, therefore, intended to cover any such modifications within the true spirit and scope of the invention.

What we claim as new and desire to secure by Letters Patent of the United States is:

1. A pressure responsive liquid flow control valve comprising a valve piston reciprocally mounted within a valve cylinder housing, said cylinder including valve ports for the passage of liquid therethrough, said piston including a valve land arranged for adjusting the opening of at least one of said valve ports upon movement thereof, said piston including a liquid flow reaction compensating tip having a cross-sectional area larger than said valve land and positioned in the path of flow of liquid controlled by said valve land through said valve to form a partial obstruction to said flow, said valve cylinder including at least one pressure connection for the application of a control pressure to said valve land.

2. A pressure responsive liquid flow control valve comprising a valve piston reciprocally mounted within a valve cylinder housing, said cylinder including valve ports for the passage of liquid therethrough, said piston including a valve land arranged for adjusting the opening of at least one of said valve ports upon movement thereof, said piston including a liquid flow reaction compensating tip member having a cross-sectional area larger than said valve land and positioned in the path of flow of liquid through said valve to form a partial obstruction to said flow, said housing including a flow restrictive member disposed therein adjacent to said compensating tip member for co-operation therewith in forming said partial obstruction, said valve cylinder including at least one pressure connection for the application of a control pressure to said valve land, at least one of said members including an axially contoured surface for providing a decrease in said flow obstruction as said valve is progressively opened.

3. A constant pressure regulating valve for regulating the pressure between a high pressure and a low pressure conduit comprising a valve housing having a cylindrical bore therein and a valve piston reciprocally mounted within said bore, said housing including at least one liquid exhaust port extending into said bore, a spring for biasing said piston to close said exhaust port, said housing including openings into the ends of said valve bore for said high pressure and low pressure conduits, said low pressure conduit being connected for the application of liquid pressure to said piston in a direction assisting said spring, and said high pressure conduit being connected for application of liquid pressure to said piston in a direction resisting said spring, said piston including a fluid flow reaction compensating tip arranged between said high pressure inlet conduit connection and said exhaust port, said tip having a larger cross-sectional area than the remainder of said piston and providing, in cooperation with said bore, a flow reaction compensating orifice for restricting the flow of liquid from said high pressure conduit to said exhaust port.

4. A constant pressure regulating valve for regulating the pressure between a high pressure and a low pressure conduit comprising a valve housing having a cylindrical bore therein and a valve piston reciprocally mounted within said bore, said housing including at least one liquid exhaust port extending into said bore, a spring for biasing said piston to close said exhaust port, said housing including openings into the ends of said valve bore for said high pressure and low pressure conduits, said low pressure conduit being connected for the application of liquid pressure to said piston in a direction assisting said spring, and said high pressure conduit being connected for application of liquid pressure to said piston in a direction resisting said spring, said piston including a fluid flow reaction compensating tip member arranged between said high pressure inlet conduit connection and said exhaust port, said housing including an inner passage member disposed adjacent to said tip member, said tip member having a larger cross-sectional area than the remainder of said piston and providing, in cooperation with said passage member, a flow reaction compensating orifice for restricting the flow of liquid from said high pressure conduit to said exhaust port, at least one of said members having an axially varying cross-sectional area to provide an increase in said reaction compensating orifice as said valve is opened.

5. In a liquid flow control valve system of the type including a throttle valve which may be set at a predetermined throttle opening corresponding to the liquid flow desired, and a constant pressure regulating bypass valve having pressure sensing connections across the throttle valve to maintain a constant pressure thereacross, an improved bypass valve structure including a valve piston mounted for reciprocal motion within a valve cylinder housing, said piston including a valve land and said cylinder including at least one valve port which together define a variable port for bypassing an amount of liquid necessary to maintain a constant throttle valve pressure, said piston including a fluid flow reaction compensating tip member of a diameter larger than said land, said housing including an inner passage member positioned for cooperation with said tip member to define a continuously open valve reaction compensating orifice, at least one of said members including an axially contoured surface for providing an increase in said reaction compensating orifice as said bypass valve is progressively opened.

6. A liquid flow control valve system including a throttle valve adjustably positionable to the throttle opening corresponding to a desired liquid flow, a constant pressure regulating bypass valve having pressure sensing connections across the throttle valve to maintain a constant pressure thereacross, said bypass valve including a valve piston mounted for reciprocal motion within a valve cylinder housing, said piston including a valve land and said cylinder including at least one valve port which together define a variable port for bypassing an amount of liquid necessary to maintain a constant throttle valve pressure, said piston including a fluid flow reaction compensating tip of a diameter larger than said land, said cylinder including a constricted portion positioned for cooperation with said reaction compensating tip to define a continuously open valve reaction compensating orifice.

7. In a fluid flow control valve system of the type including a throttle valve which may be set at a predetermined throttle opening corresponding to the liquid flow desired, and a constant pressure regulating bypass valve having pressure sensing connections across the throttle valve to maintain a constant pressure thereacross, an improved bypass valve structure including a valve piston mounted for reciprocal motion within a valve cylinder, said piston including a valve land and said cylinder including at least one valve port which together define a variable port for bypassing an amount of liquid necessary to maintain a constant throttle valve pressure, said piston including a fluid flow reaction compensating tip of a diameter larger than said land, said cylinder including a constricted portion positioned for cooperation with said reaction compensating tip to define a continuously open valve reaction compensating orifice, said reaction compensating tip including an axially coverging surface for providing an increase in said reaction compensating orifice as said bypass valve is progressively opened.

8. A combined constant pressure and maximum pressure regulating valve system for regulating the pressure between a high pressure and a low pressure conduit and for limiting the maximum level of said pressures comprising a valve housing having a cylindrical bore therein and a valve piston reciprocally mounted within said bore, said housing including a liquid exhaust port extending into said bore, a spring for biasing said piston to close said exhaust port, said housing including openings into the ends of said bore respectively for receiving high pressure and low pressure conduits, said low pressure conduit being connected for the application of liquid pressure to said piston in a direction assisting said spring, and said high pressure conduit being connected for application of liquid pressure to said piston in a direction resisting said spring, said piston including a fluid flow reaction compensating tip arranged between said high pressure inlet conduit connection and said exhaust port, said tip having a larger cross-sectional area than the remainder of said piston and providing, a cooperation with said bore, a flow reaction compensating orifice for restricting the flow of liquid from said high pressure conduit to said exhaust port, said low pressure conduit connection including a flow limiting orifice, and overpressure relief pilot valve connected for sensing the level of said pressures for actuation in response to a predetermined maximum allowable value thereof, said pilot valve including a connection to the low pressure end of said bore for exhausting the pressure therein upon actuation thereof.

9. A system for supplying a predetermined adjustable volume of liquid under varying input and delivery pressure conditions from a liquid pump comprising a throttle valve, a valve inlet conduit for connection to the liquid pump, a delivery conduit connected to said valve for connection to apparatus to which liquid is to be delivered, said valve including a valve piston having a flow throttling land and a delivery port communicating with said delivery conduit positioned for closure by said valve land, one side of said valve land communicating with said inlet conduit, a connection from the other side of said valve land to an exhaust conduit, the axial length of said valve land being less than the axial length of said port so that closure of said port on the inlet conduit side results in opening of said port on the exhaust conduit side for establishing communication between said delivery conduit and said exhaust conduit, a cam device connected to said valve piston and a motor connected to said cam device for setting the position of said piston according to the rate of liquid flow desired, a bypass valve including a housing having a cylindrical bore therein, a connection from one end of said bore to said inlet conduit and a connection including a fixed flow limiting orifice from the other end of said bore to said delivery conduit, a bypass valve piston reciprocally mounted within said bore and including a valve land, said housing including a port extending from said bore and a connection therefrom to said exhaust conduit, said bypass valve port being positioned for closure by said bypass land upon bias of said bypass piston by the pressure of liquid from said delivery conduit and for opening thereof by the pressure of liquid from said inlet conduit, a spring connected to said bypass piston for bias thereof in the closing direction, said bypass piston including a liquid flow reaction compensating tip of a diameter larger than said bypass valve land positioned within said housing to partially obstruct the flow of liquid from said inlet conduit to said bypass port, an over-pressure relief pilot valve connected to the delivery conduit end of said bore for opening in response to an over-pressure condition therein, and a connection from said pilot valve for conveying liquid passed thereby to said exhaust conduit.

10. A system for supplying a predetermined adjustable volume of liquid under varying input and delivery pressure conditions from a liquid pump comprising a throttle valve having an inlet conduit for connection to the liquid pump and a delivery conduit for connection to apparatus to which liquid is to be delivered, said valve including a low pressure exhaust opening and an adjustable flow control valve element for providing a variable flow control passage between said inlet and delivery conduits during operating conditions and for providing a connection between said delivery conduit and said exhaust opening during stand-by conditions, a bypass valve including a housing having a cylindrical bore therein, a connection from one end of said bore to said inlet conduit and a connection from the other end of said bore to said delivery conduit, a piston reciprocally mounted within said bore, said housing including a port extending from said bore and a connection therefrom to said exhaust conduit, said port being positioned for closure by said piston upon bias of said piston by the pressure of liquid from said delivery conduit and for opening thereof by the pressure of liquid from said inlet conduit, a spring connected to said piston for bias thereof in the closing direction, said piston including a liquid flow reaction compensating tip of a diameter larger than the remainder thereof positioned within said housing to partially obstruct the flow of liquid from said inlet conduit to said port.

11. A system for supplying a predetermined adjustable volume of liquid under varying input and delivery pressure conditions from a liquid pump comprising a throttle valve having an inlet conduit for connection to the liquid pump and a delivery conduit for connection to apparatus to which liquid is to be delivered, said valve including a low pressure exhaust opening and an adjustable flow control valve element for providing a variable flow control passage between said inlet and delivery conduits during operating conditions and for providing a connection between said delivery conduit and said exhaust opening during stand-by conditions, a bypass valve including a housing having a cylindrical bore therein, a connection from one end of said bore to said inlet conduit and a connection including a flow limiting orifice from the other end of said bore to said delivery conduit, a piston reciprocally mounted within said bore, said housing including a port extending from said bore and a connection therefrom to said exhaust conduit, said port being positioned for closure by said piston upon bias of said piston by the pressure of liquid from said delivery conduit and for opening thereof by the pressure of liquid from said inlet conduit, a spring connected to said piston for bias thereof in the closing direction, said piston including a liquid flow reaction compensating tip of a diameter larger than the remainder thereof positioned within said housing to partially obstruct the flow of liquid from said inlet conduit to said port, an overpressure relief pilot valve connected to the delivery conduit end of said bore for opening in response to an over-pressure condition therein, and a connection from said pilot valve for conveying liquid passed thereby to said exhaust conduit.

References Cited in the file of this patent

UNITED STATES PATENTS

| Number | Name | Date |
|---|---|---|
| 2,102,865 | Vickers | Dec. 21, 1937 |
| 2,445,544 | Trautman | July 20, 1948 |
| 2,470,382 | Vanni | May 17, 1949 |
| 2,649,107 | Avery | Aug. 18, 1953 |